(12) United States Patent
Shin et al.

(10) Patent No.: US 7,908,561 B2
(45) Date of Patent: Mar. 15, 2011

(54) APPARATUS AND METHOD OF PROVIDING WEB BASED PERSONALIZED SERVICE

(75) Inventors: Young Mee Shin, Daejeon (KR); Sang Ki Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 803 days.

(21) Appl. No.: 11/974,470

(22) Filed: Oct. 12, 2007

(65) Prior Publication Data

US 2008/0140677 A1      Jun. 12, 2008

(30) Foreign Application Priority Data

Dec. 11, 2006 (KR) .................. 10-2006-0125662

(51) Int. Cl.
*G06F 15/00* (2006.01)
*G06F 13/00* (2006.01)

(52) U.S. Cl. ....................................................... 715/763

(58) Field of Classification Search .......... 715/763–765, 715/740–743, 840, 848, 851–853, 205; 717/121; 707/1, 10
See application file for complete search history.

(56) References Cited

U.S. PATENT DOCUMENTS

| | | | |
|---|---|---|---|
| 6,182,136 B1 * | 1/2001 | Ramanathan et al. | 709/224 |
| 7,031,967 B2 * | 4/2006 | Cheng et al. | 1/1 |
| 7,100,107 B2 | 8/2006 | Creamer et al. | |
| 2007/0070066 A1 * | 3/2007 | Bakhash | 345/419 |

FOREIGN PATENT DOCUMENTS

| | | |
|---|---|---|
| KR | 2004-0075966 A | 8/2001 |
| KR | 2002-0005147 A | 1/2002 |
| KR | 2004-0001346 A | 1/2004 |
| KR | 2004-0001407 A | 1/2004 |
| KR | 2005-0071720 A | 7/2005 |

* cited by examiner

*Primary Examiner* — Cao "Kevin" Nguyen
(74) *Attorney, Agent, or Firm* — Blakely, Sokoloff, Taylor & Zafman LLP

(57) ABSTRACT

A method and an apparatus for providing a web based personalized service are provided. A user accesses and subscribes to a service portal by using a web browser of a personal device. The user directly generates the user's own service, previously simulates the generated service, and registers the service to the service portal. The user activates a service included in a My Service list, when the service is required. The activated service is directly provided to the user by using the personal data included in the service portal during runtime or personal data distributed over the personal device. Thus, the user participates in generation of a service and generates service logic for the user. Later, the user directly uses the service. Accordingly, a personalized service is provided.

35 Claims, 17 Drawing Sheets

FIG. 5

| 1 | (COMPONENT NAME, Default) |
|---|---|
| 2 | (COMPONENT NAME, {PROPERTY1, Value}, {PROPERTY, Value}, ..., {PROPERTYn, Value}) |
| ... | ... |
| n | |

FIG. 6

| SERVICE NAME | SERVICE WEB PAGE URL | LOCATION OF SERVICE EXECUTION FILE | URL FOR DYNAMICALLY PROVIDING PERSONAL DATA | LOG PERMISSION | SERVICE STATUS |
|---|---|---|---|---|---|
| | | | | true or false | active or idle |

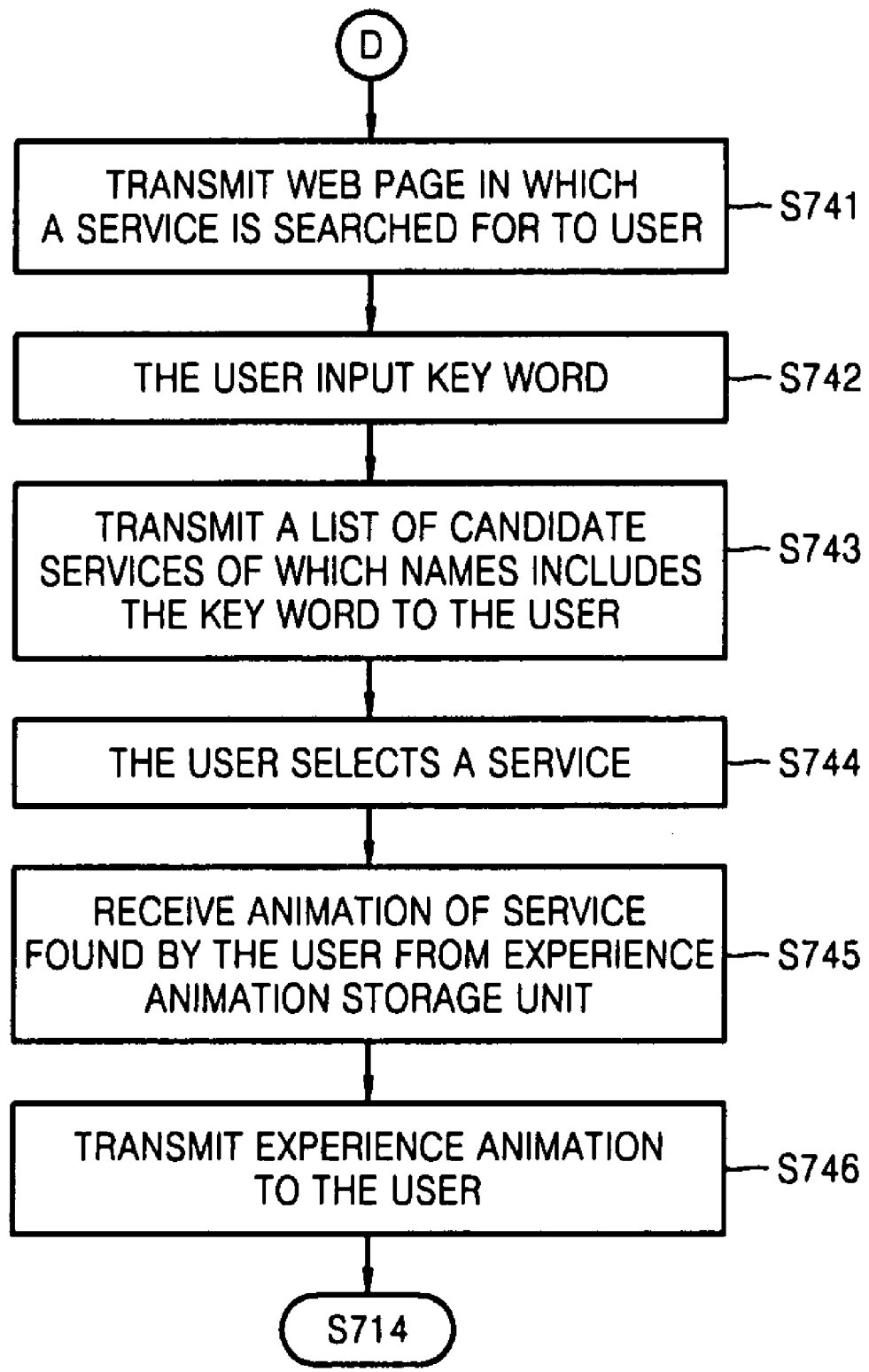

APPARATUS AND METHOD OF PROVIDING WEB BASED PERSONALIZED SERVICE

CROSS-REFERENCE TO RELATED PATENT APPLICATION

This application claims the benefit of Korean Patent Application No. 10-2006-0125662, filed on Dec. 11, 2006, in the Korean Intellectual Property Office, the disclosure of which is incorporated herein in its entirety by reference.

BACKGROUND OF THE INVENTION

1. Field of the Invention

The present invention relates to an apparatus and a method of providing a service, and more particularly, to an apparatus and a method of providing a personalized service, in which a user generates and uses the personalized service in a web based environment.

This work was supported by the IT R&D program of MIC/IITA.[2005-S056-02, Development of Open API and Service Platform Technologies]

2. Description of the Related Art

There is no antecedent related to a technique of providing a personalized service in an open environment based on Parlay architecture. However, there exist some antecedents related to the technique of providing the personalized service in the Internet or existing neural network.

There is Korean Patent No. 0543311 as an antecedent. In the antecedent, an audio file corresponding to greetings and a destination name among the destination menu information is generated and stored, after destination menu information in a text type is received from a subscriber on a web. When a service for the subscriber is requested to be provided, the previously stored greetings are transmitted, and destination announcements including destination names are transmitted so that a user can call the subscriber.

There is Korean Patent No. 0420486 as another antecedent. In the antecedent, a user estimates member information that is input when the user is registered as a member, a user class according to rules defined by an administrator, and a pattern of information used by the user so as to provide the most suitable information for the user.

There is Korean Patent No. 2005-0071720 as another antecedent. In the antecedent, a customized homepage is produced on the basis of a preference by receiving the preference in a layout and a style of a homepage from the user.

There is Korean patent application publication No. 2004-0001346 as another antecedent. In the antecedent, an application customized for a user is provided during runtime of a service by allowing the user to select desired components among components that constitute an application when the user subscribes to the service. That is, a customized service is provided by assembling components during runtime of the service by using a service definition in which correlation between components selected by the user and an application template is defined. In the present antecedent, although it is intended to customize not data used by the application but application logic, personalization is provided by using a method in which service construction information is stored in a database and used during runtime of the service.

There is U.S. Pat. No. 7,100,107B2 as another antecedent. The present antecedent patent relates to a method in which user information and preferences are gathered by using hypermedia and applied to service components that constitute a service. Like the aforementioned patent (Korean patent application publication No. 2004-0001346), in the present patent, personalization is provided by maintaining a service application provided by a service provider and applying input data of the user to the service.

In the conventional techniques, personal information (for example, personal profile information, personal tastes, terminal capability, and the like) is gathered from a user, stored by using on-line or off-line means, and suitably used when the service is executed in order to provide a personalized service depending on the user. That is, the service provider prepares a service logic program, and the user inputs personal information through a service provisioning process. The data is used when the service logic is executed, and the personalized service is provided.

The existing techniques are suitable for a structure of a current communication network. That is, in the structure, a service provider who owns a communication network provides a service, and a general user uses the service. In order to provide a personalized service depending on the user in the existing communication environment, the service provider gathers personal information from users through a means such as a web and uses the gathered information during runtime of the service logic program.

However, in the existing techniques, limited personalization can be obtained. The service provider gathers information needed for the service in order to provide the service and uses the gathered information according to predetermined service logic. Finally, the users provides personalized information according to predetermined a scenario within a range defined by the service provider and receives a personalized service. In addition, although it is possible for the personalized service to use personal data (a phone book, a schedule, a multimedia file, and the like) stored in a personal device, the existing techniques do not provide a method of using the personal data.

Current service users gradually changes from passive users to active users and requires the existing service to be slightly modified or requires completely new service to be provided. The existing method of providing personalization in the current communication environment cannot satisfy various desires of the users.

In addition, in the existing communication network environment, since the service logic is constructed with a complex communication network protocol, it is possible for only experts in programming and communication networks to prepare the service logic. Since it takes long time and hard efforts to create a new service and start the service, it is difficult to successively create new services suitable for various desires of users.

SUMMARY OF THE INVENTION

The present invention provides a method and an apparatus in which a user accesses a service portal by using a web browser of a personal device, generates a personal service using Parlay Open API, and use the generated service.

According to an aspect of the present invention, there is provided an apparatus for providing a web based personalized service, the apparatus including: a service information storage unit in which information on a service including a service name and a URL for dynamically providing personal data is stored; a service generation unit which provides software used to generate a service so that a user generates the service by using the software suitable for an operating system of a personal device of the user; a service registration unit which stores the generated service, receives the information on the generated service from the user, and stores the information in the service information storage unit; and a service execution unit which provides the information on services generated by the user to the user and executes a service which is requested by the user to be executed on the basis of the information on the generated services.

According to another aspect of the present invention, there is provided a method of providing a web based personalized service, the method including: (a) providing software used to generate a service so that a user generates the service by using the software suitable for an operating system of a personal device of the user; (b) storing the generated service, receiving information on the generated service including a service name and a URL for dynamically providing personal data, and storing the information; and (c) providing the information on services generated by the user to the user and executing a service which is requested by the user to be executed on the basis of the information on the services.

BRIEF DESCRIPTION OF THE DRAWINGS

The above and other features and advantages of the present invention will become more apparent by describing in detail exemplary embodiments thereof with reference to the attached drawings in which:

FIG. 5 illustrates a format of a result value of service customizing according to an embodiment of the present invention;

FIG. 6 illustrates a format of service information stored in a service information storage unit as a result of registration of a service according to an embodiment of the present invention; and FIGS. 7 and 8A to 8M are flowcharts illustrating a method of providing a web-based personalized service according to an embodiment of the present invention.

DETAILED DESCRIPTION OF THE INVENTION

Now, preferred embodiments of the present invention will be described in detail with reference to the attached drawings.

Figure 1:
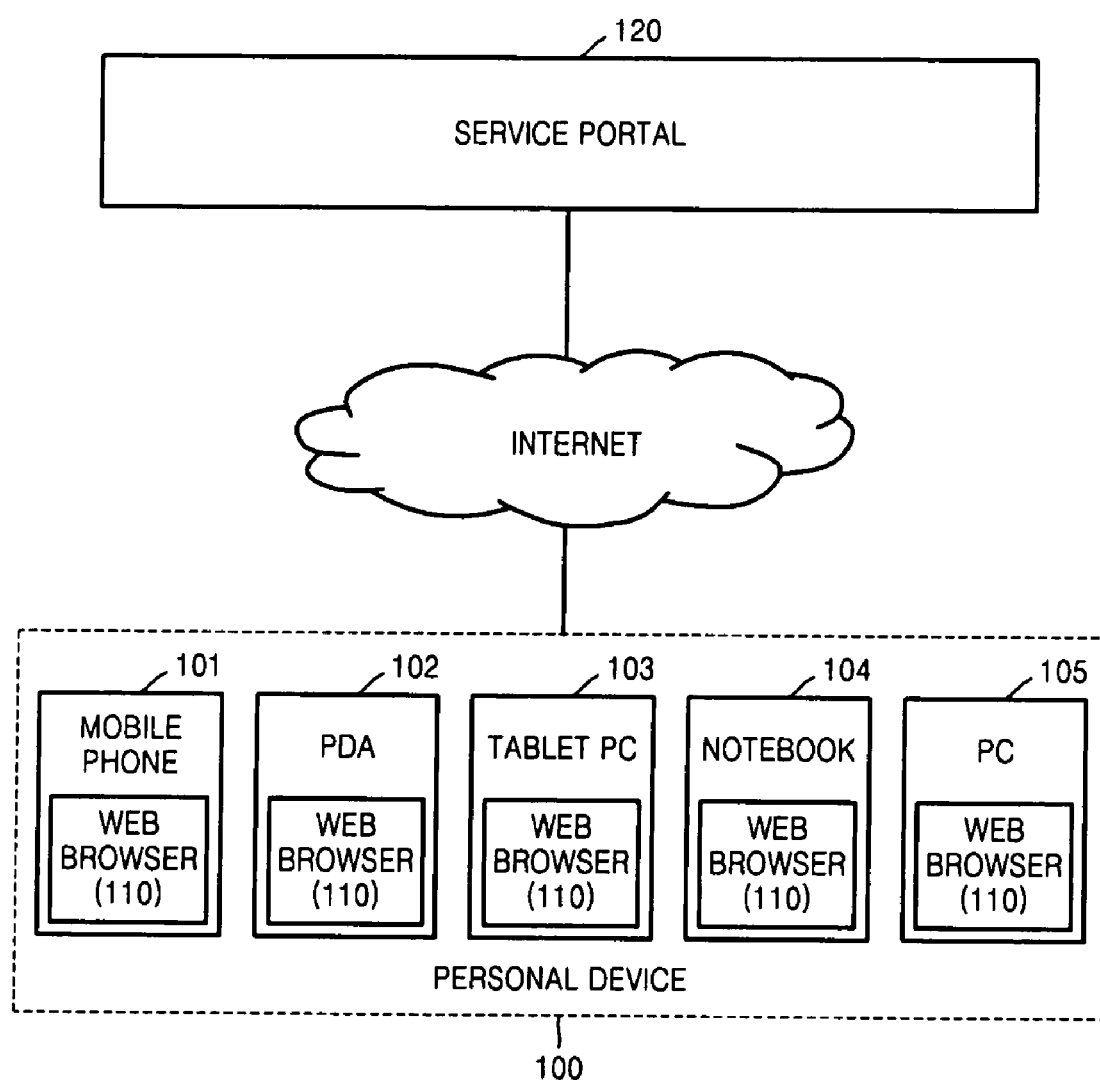
FIG. 1 is a conceptual view illustrating an apparatus for providing a personalized service according to an embodiment of the present invention.

FIG. 1 is a conceptual view illustrating an apparatus for providing a personalized service according to an embodiment of the present invent.

Referring to FIG. 1, a system for providing a personalized service according to the embodiment of the present invention is constructed with a personal device 100 and a service portal 120. The service portal 120 is connected to the personal device 100 through the Internet. The personal device interacts with a user by accessing the service portal 120 through a web browser 110, which is installed in a mobile phone 101, a personal digital assistant (PDA) 102, a tablet PC 103, a notebook computer 104, a desktop PC 105, and the like and displaying a web page provided by the service portal 120 on a screen. The service portal 120 provides functions of a web server for generating and providing a service and a service application server which executes the generated service.

Figure 2:
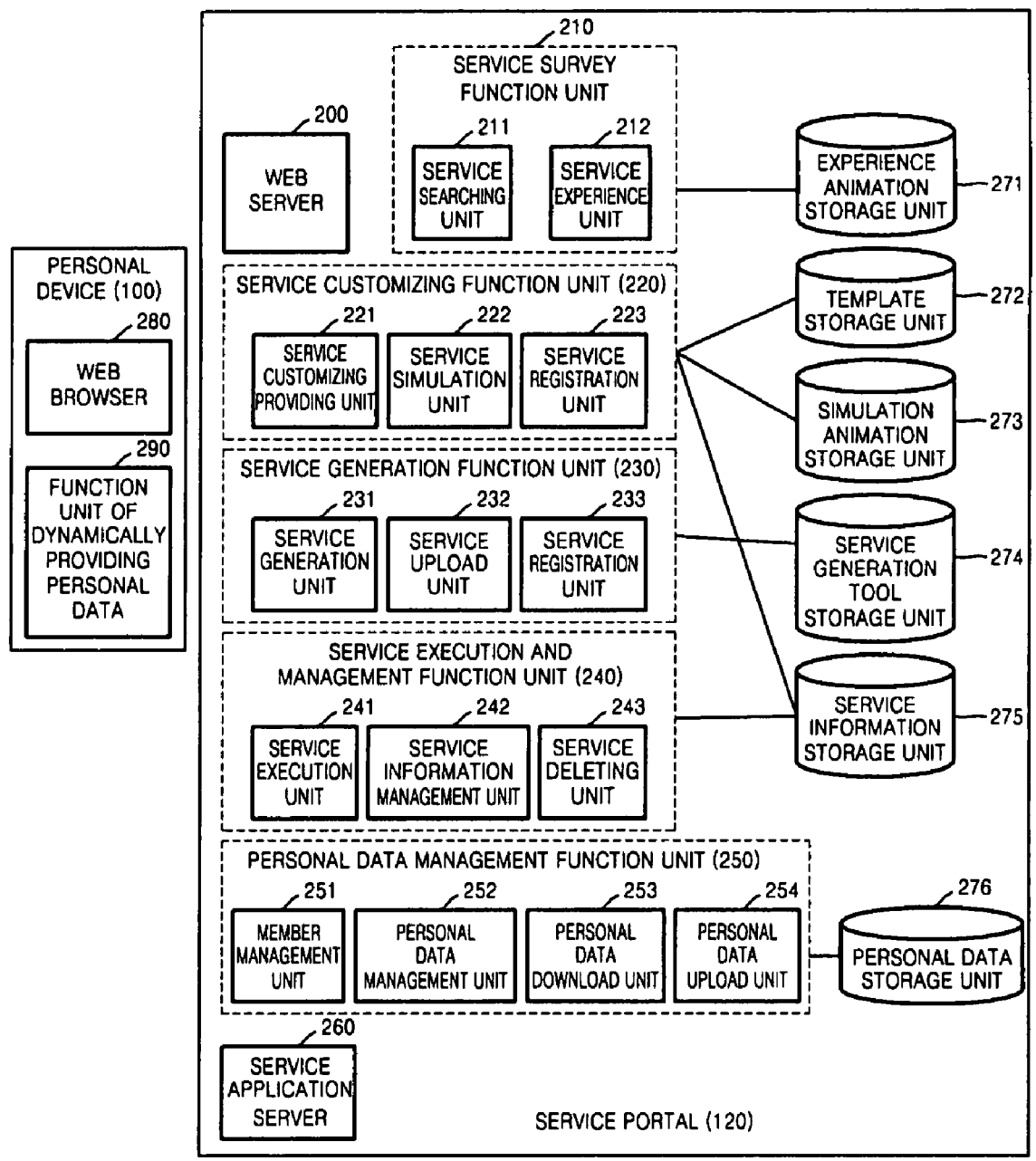
FIG. 2 is a schematic diagram illustrating an apparatus for providing a personalized service according to an embodiment of the present invention.

FIG. 2 is a schematic diagram illustrating an apparatus for providing a personalized service according to an embodiment of the present invention.

Referring to FIG. 2, the service portal 120 includes a web server 200, a service survey function unit 210, a service customizing function unit 220, a service generation function unit 230, a service execution and management function unit 240, a personal data management function unit 250, and a service application server 260.

Both of the service customizing function unit 220 and the service generation function unit 230 provide a function of generating a personalized service. The service customizing function unit 220 serves to generate a personalized service so as to customize a predetermined part of a template for a user by providing a predetermined service template to the user. The service generation function unit 230 serves to generate a completely new service for a user.

The web server 200 allows the service portal 120 to be accessed through a web browser of a personal device 100 and serves to transmit a web page requested by the user.

The service survey function unit 210 is constructed with a service searching unit 211 and a service experience unit 212. The service searching unit 211 serves to search for a desired service by allowing the user to input a keyword. The service experience unit 212 receives an experience animation for a service found by the user from an experience animation storage unit 271 and transmits the experience animation to the web browser of the user. The user controls the animation by using play, stop, and pause functions in a menu.

The service customizing function unit 220 is constructed with a service customizing providing unit 221, a service simulation unit 222, and a service registration unit 223. The service customizing providing unit 221 receives a template for a service requested by the user from a service template storage unit 272 and displays the template on the web browser of the user. When customizing for the user is completed, information customized by the user is transmitted to the service simulation unit 222 and the service registration unit 223.

The service simulation unit 222 receives a simulation animation corresponding to the service requested by the user from a service simulation animation storage unit 273, applies the service customizing information transmitted by the service customizing providing unit 221 to the animation, and transmits the animation to the web browser of the user. The user controls the animation by using play, stop and pause functions in a menu.

The service registration unit 223 receives information on service registration from the user. When a service name, a URL for dynamically providing personal data, a log file recording permission, a service reservation permission, a timer permission, and a service loop permission are input by the user, an input value of the user and the service customizing information provided by the service customizing providing unit 221 are applied to a service logic program of FIG. 3. Then, the service logic program is built and made into an execution file. Information on the service is stored in the service information storage unit 275, after the service logic program is built.

The service information storage unit 275 stores information on services generated by the user. As shown in FIG. 6, the service information stored in the service information storage unit 275 includes a service name, a service web page URL, a location of a service execution file, a URL for dynamically providing personal data, a log permission, and a service status.

The service generation function unit 230 is constructed with a service generation unit 231, a service upload unit 232, and a service registration unit 233. The service generation unit 231 serves to download software for service generation and testing tools suitable for an operating system of the personal device selected by the user to the personal device of the user. The user installs the downloaded software in the personal device after downloading the software and generates the service by using the software. In a method of generating the service, a graphic editor is used. The graphic editor is constructed with a building block palette and a canvas. A building block is a basic unit which constitutes the service and corresponds to Parlay X Open API, condition statements of a program ("if", "goto", "start", "end", and the like), or utility API (API for user I/O, file handling, timer handling, and the like). The user connects building blocks drawn on the canvas to one another by selecting a desired building block in the building block palette and dragging the selected building block. When graphical editing is completed, the editing result is stored. Code is generated as the service logic program. The generated code is a web application. After the codes are generated, the service is built in order to create an execution file.

The user requests the service upload unit 232 to upload the service and uploads the service generated in the personal device 100 to the service portal 120. After the service is uploaded, the service registration unit 233 allows the user to input a service name, a URL for dynamically providing personal data, and a log file recording permission. When the user completed the input operation, the information on the service is stored in the service information storage unit 275 by using the input value of the user.

The service execution and management unit 240 is constructed with a service execution unit 241, a service information management unit 242, and a service deleting unit 243. The service execution unit 241 displays a service list stored in the service information storage unit 275 on the web browser of the user. When a service is selected from the service list, the service execution unit 241 receives the service web page URL of the service from the service information storage unit 275 and transmits the web page to the web browser of the user. When the user clicks a start button in the service web page, the service execution unit 241 receives a location of a service execution file from the service information storage unit 275 and requests the service application server 260 to drive the service execution file. Then, a value of a status field of the service is modified into active in the service information storage unit 275. When the user later selects a stop button of the service, the service execution unit 241 requests the service application server 260 to stop the service. Then, a value of the status field of the service is modified into idle in the service information storage unit 275.

When the user modifies the service information, after the service information management unit 242 receives the service information from the service information storage unit 275 and transmits the service information to the web browser of the user, the value modified by the user is stored in the service information storage unit 275.

The service deleting unit 243 deletes the information on the service in the service information storage unit 275, when the user requests a service to be deleted.

The personal data management function unit 250 is constructed with a member management unit 251, a personal data management unit 252, a personal data download unit 253, and a personal data upload unit 254. A member management unit 251 stores membership subscription and member information in the personal data storage unit 276. The personal data to be managed by the personal data management unit 250 includes a phone book, a group phone book, a multimedia file, a schedule, call records, and the like. The personal data management unit 252 serves to add/modify/delete the personal data. The personal data download unit 253 serves to download the personal data stored in the personal data storage unit 276 of the service portal 120 to the personal device 100. The personal data upload unit 254 serves to upload the personal data stored in the personal device 100 to the personal data storage unit 276 of the service portal 120.

The service application server 260 drives or stops a service process by a request of the service execution unit 241. Then, the driven service process is periodically service-live-tested. When the service process is finished, a value of the status field of the service is modified into idle in the service information storage unit 275.

A web browser 280 of the personal device 100 interacts with the user by accessing the service portal 120 and displaying a web page provided by the service portal 120 on the personal device. When the personalized service of the service portal 120 requests the personal data stored in the personal device 100 to be provided during runtime, a function unit 290 of dynamically providing personal data serves to transmit requested data. The function 290 of dynamically providing personal has to be provided to the personal device as a web service or server program for communication.

Figure 3:
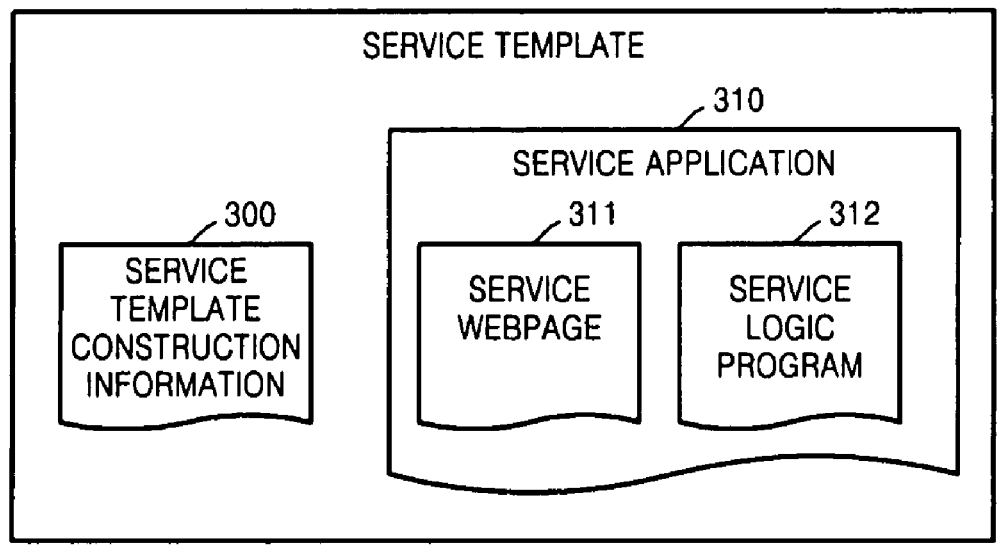
FIG. 3 is a schematic diagram illustrating a service template for providing service customizing according to an embodiment of the present invention.

FIG. 3 is a schematic diagram illustrating a service template for providing service customizing according to an embodiment of the present invention.

Referring to FIG. 3, a service template is constructed with service template construction information 300 and a service application 310. The service is constructed with components. The components correspond to Parlay X Open API, condition statements of a program ("if", "goto", "start", "end", and the like), or utility API (API for user I/O, file handling, timer handling, and the like).

Figure 4:
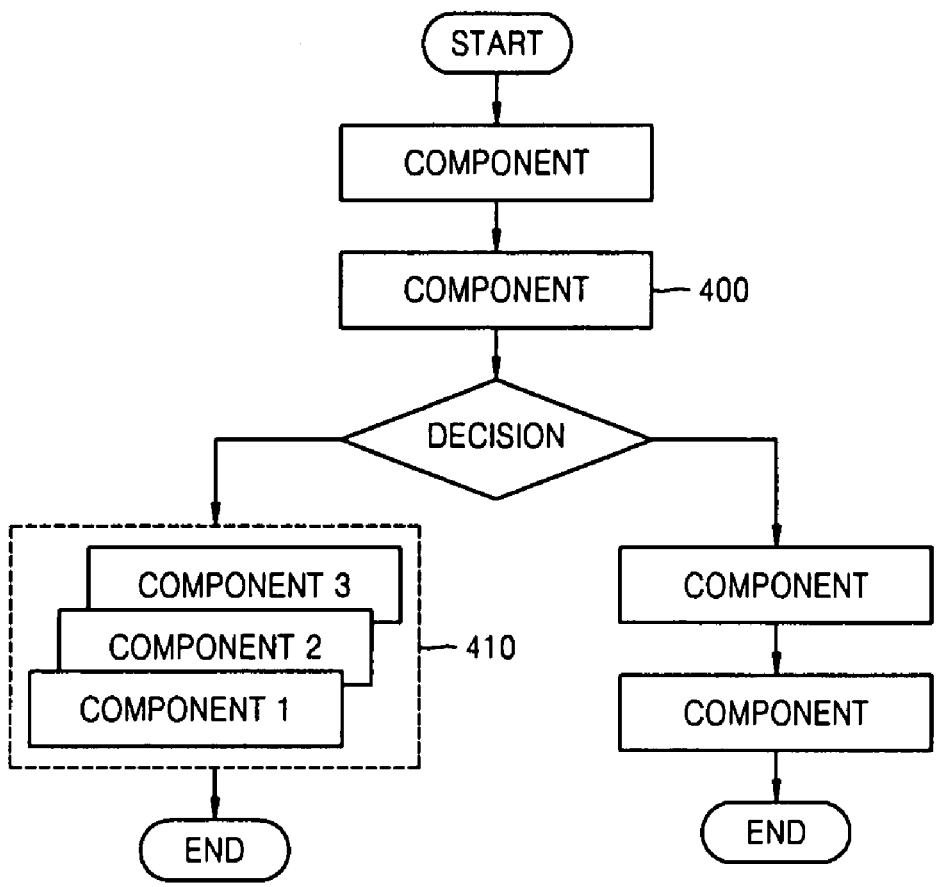
FIG. 4 illustrates a shape of a service template displayed to user in order to provide service customizing according to an embodiment of the present invention.
Figure 7:
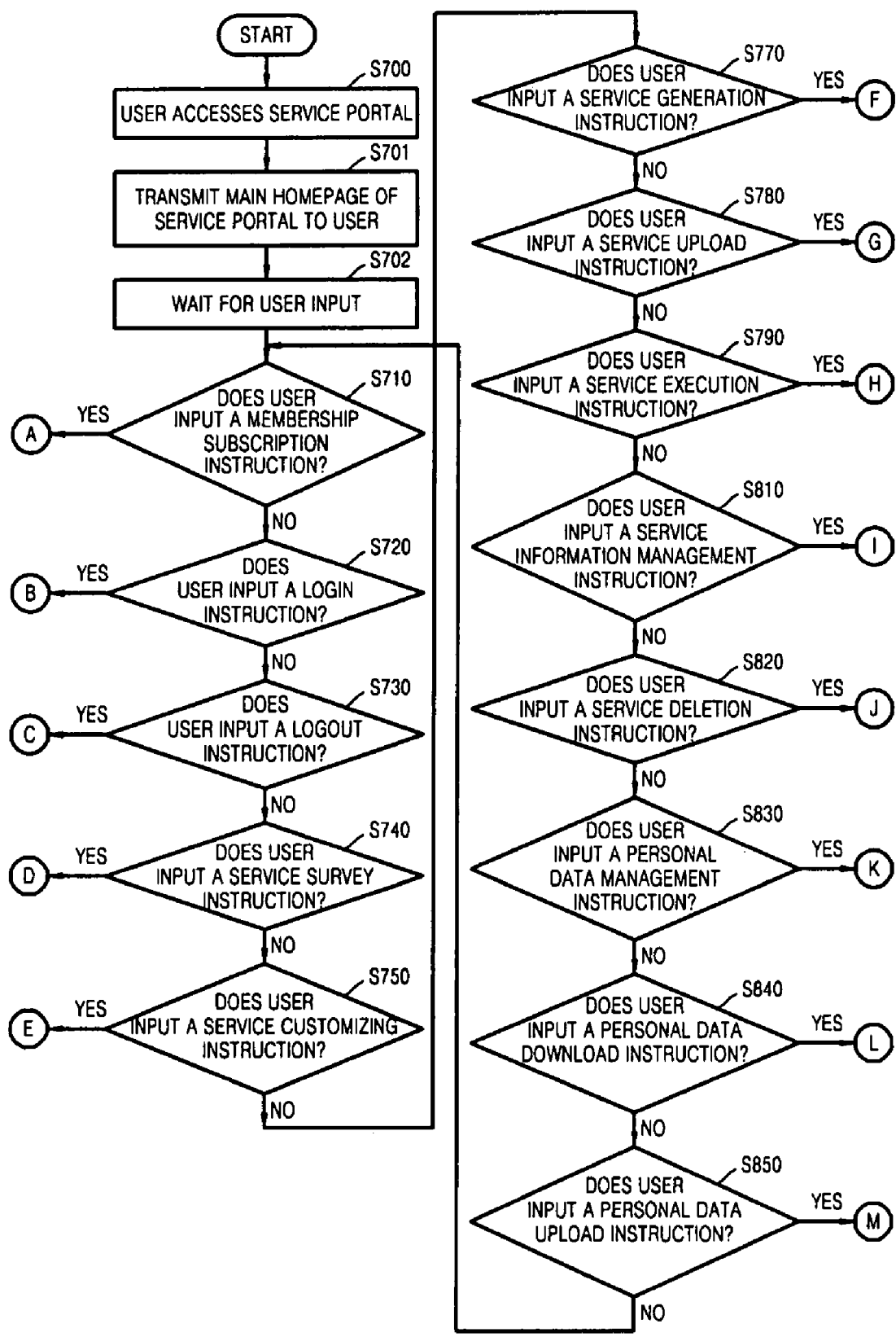
Figure 8A:
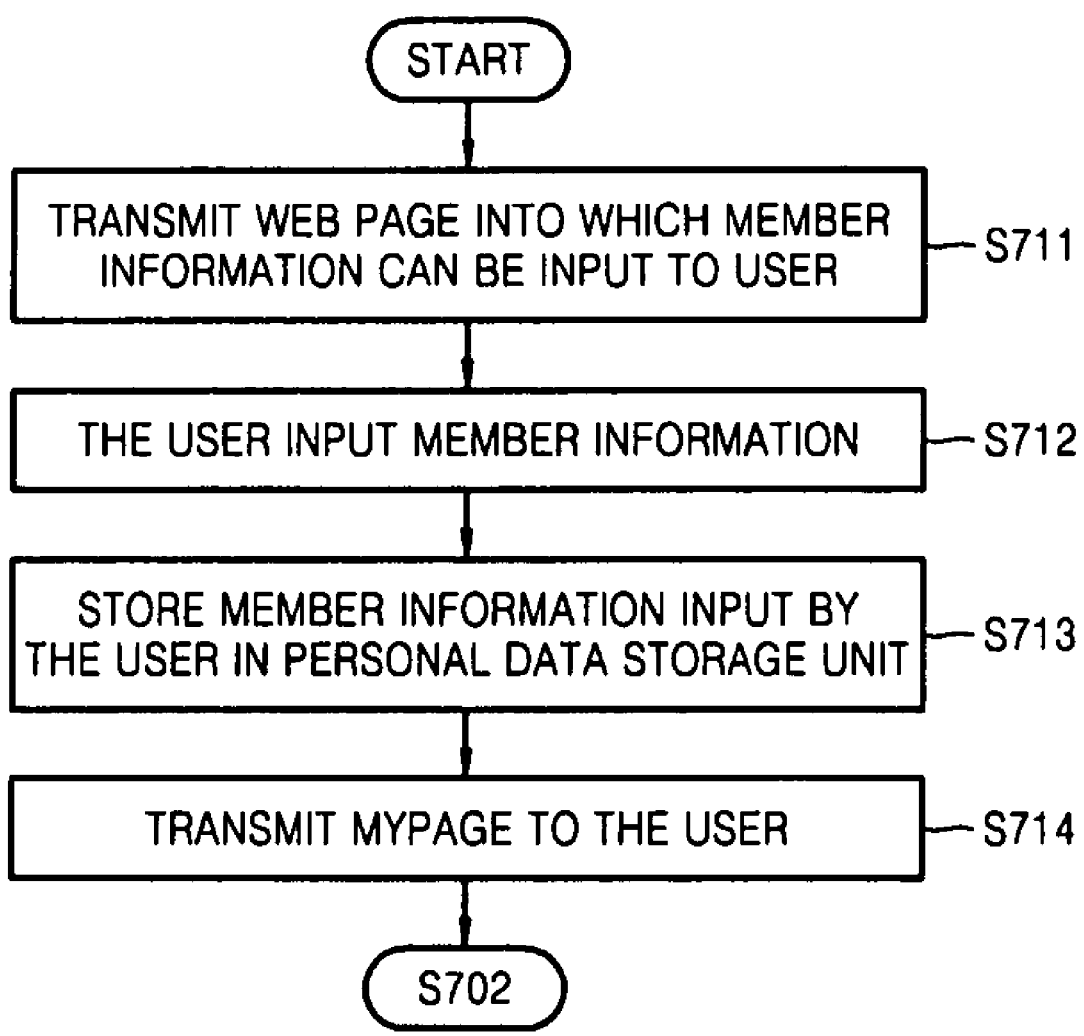
Figure 8B:
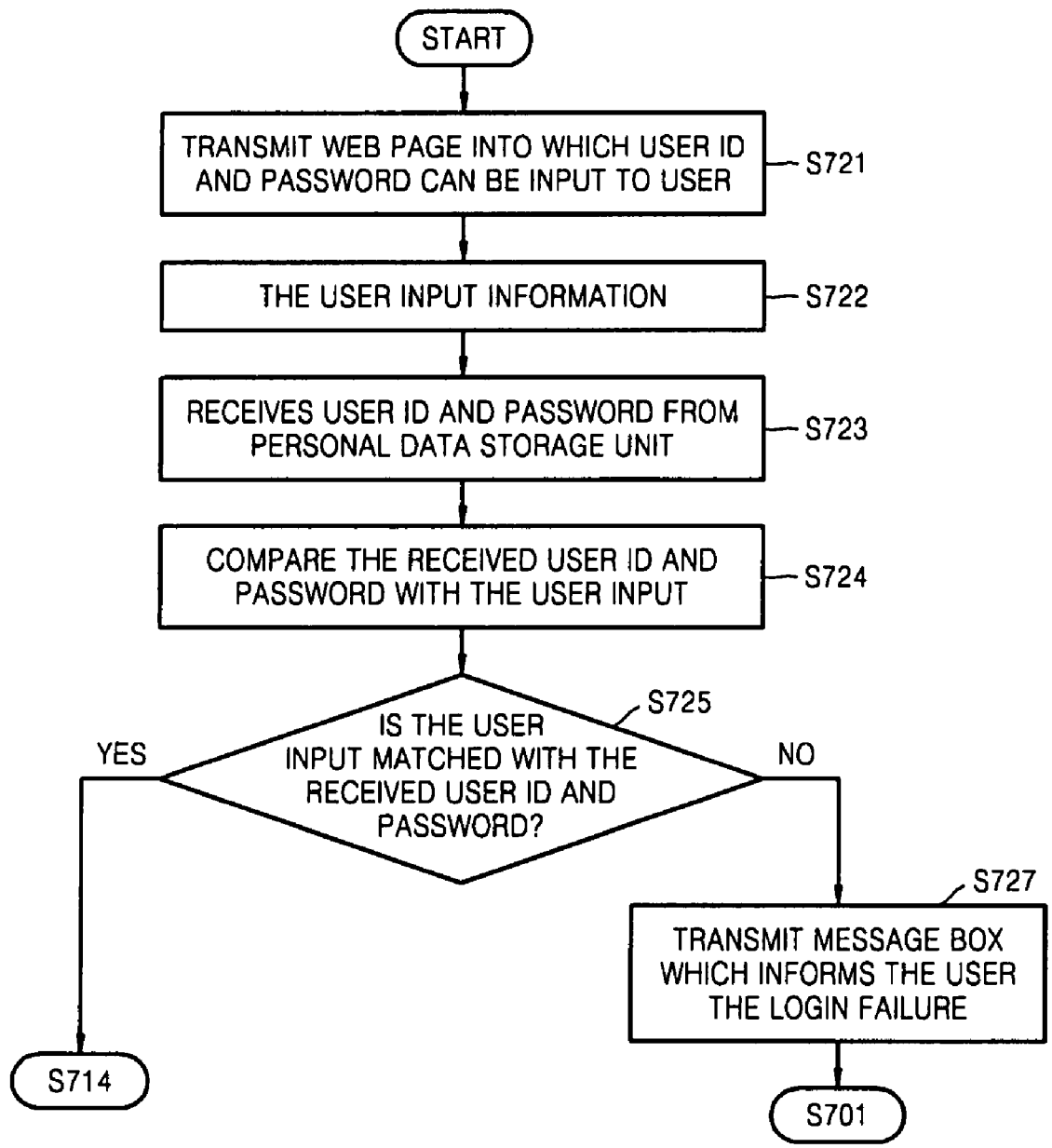
Figure 8C:
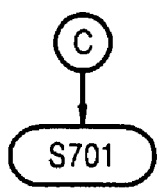
Figure 8E:
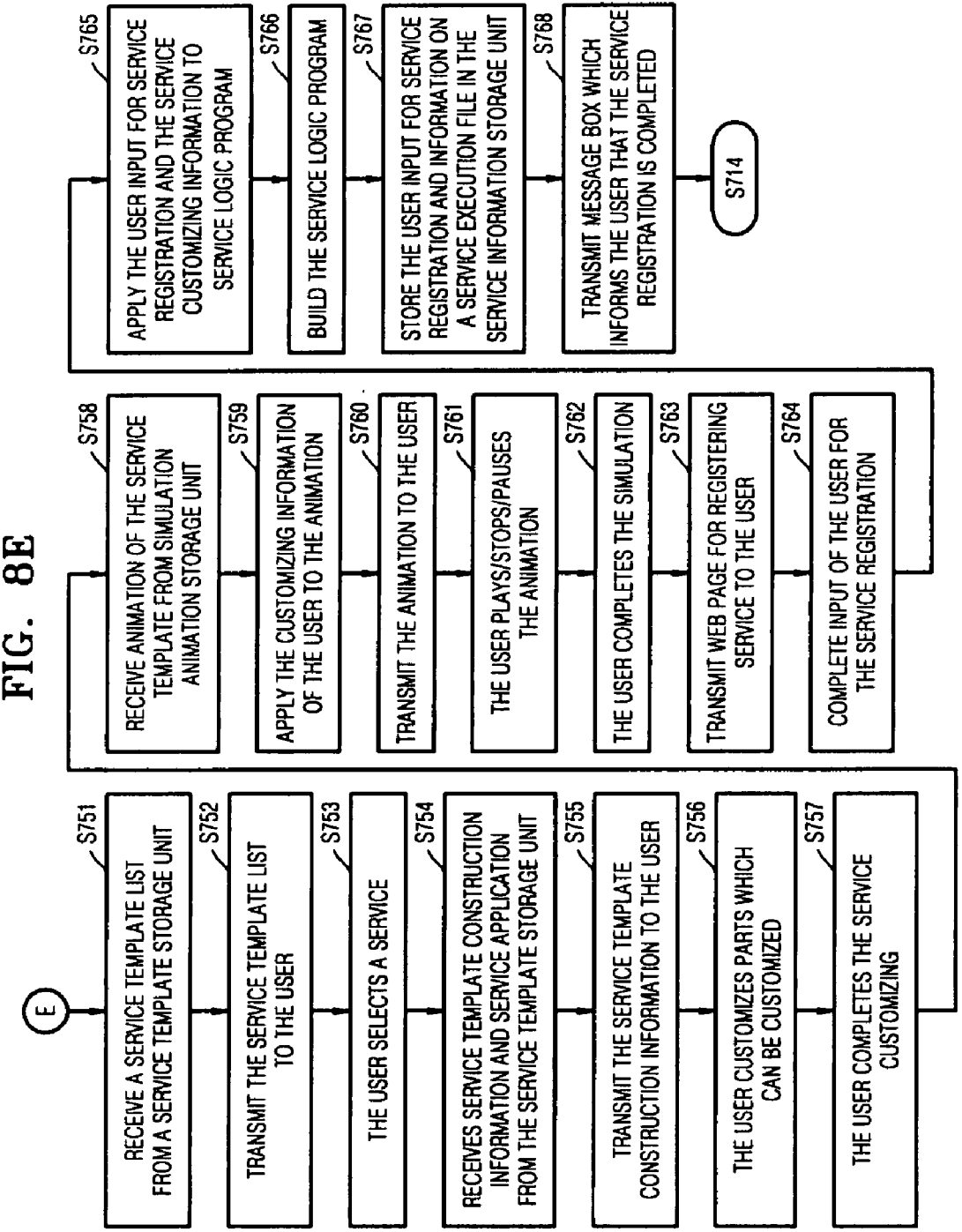
Figure 8F:
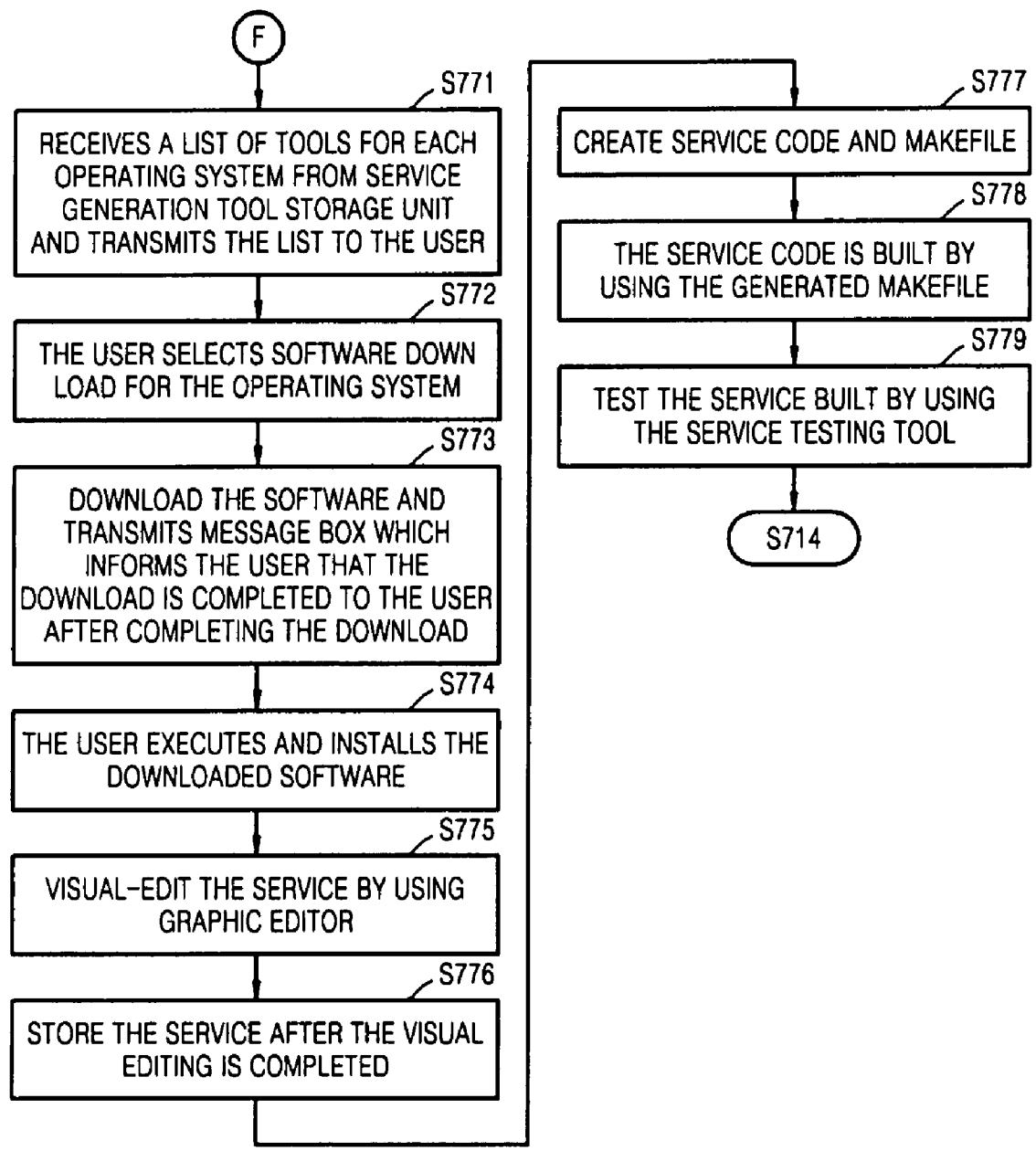
Figure 8G:
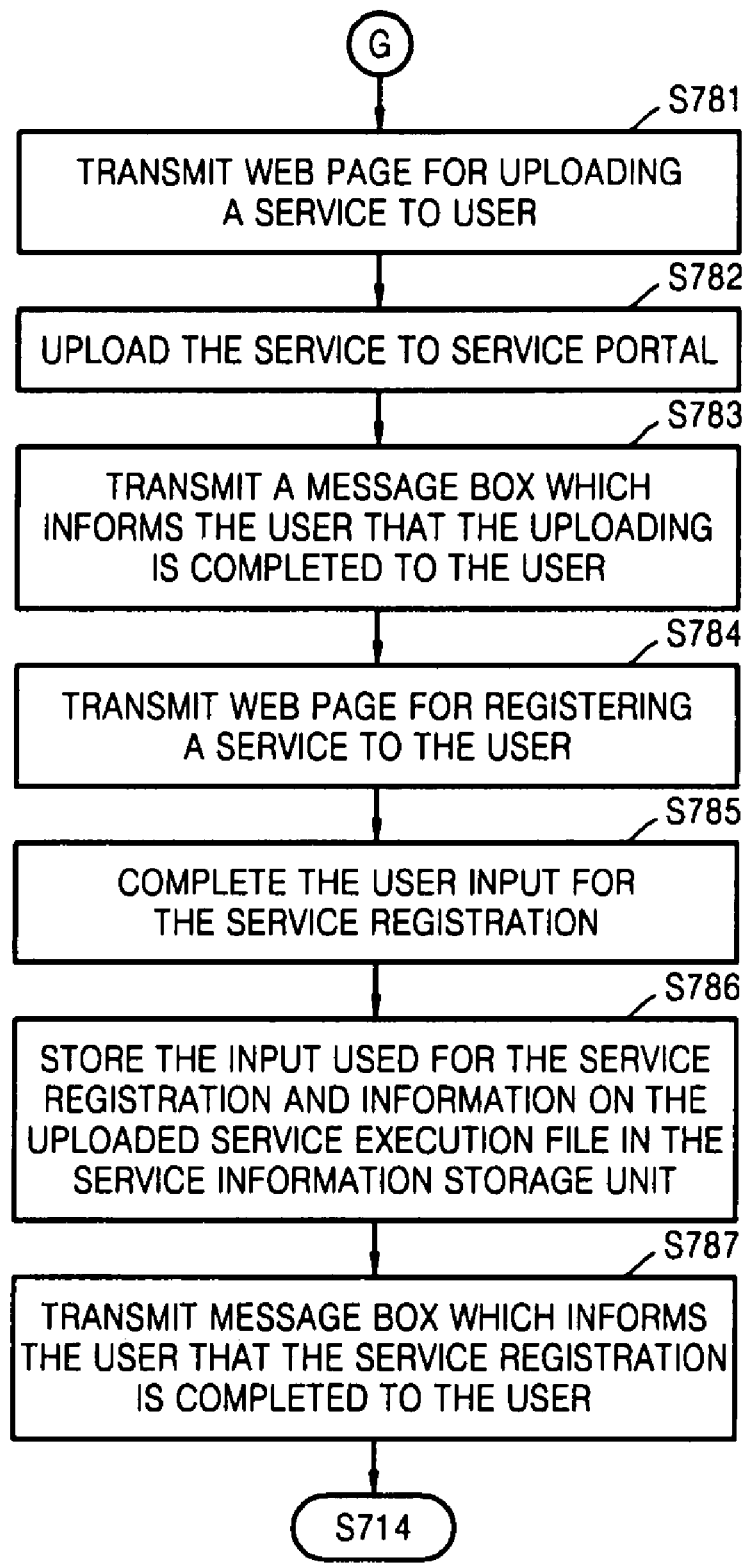
Figure 8H:
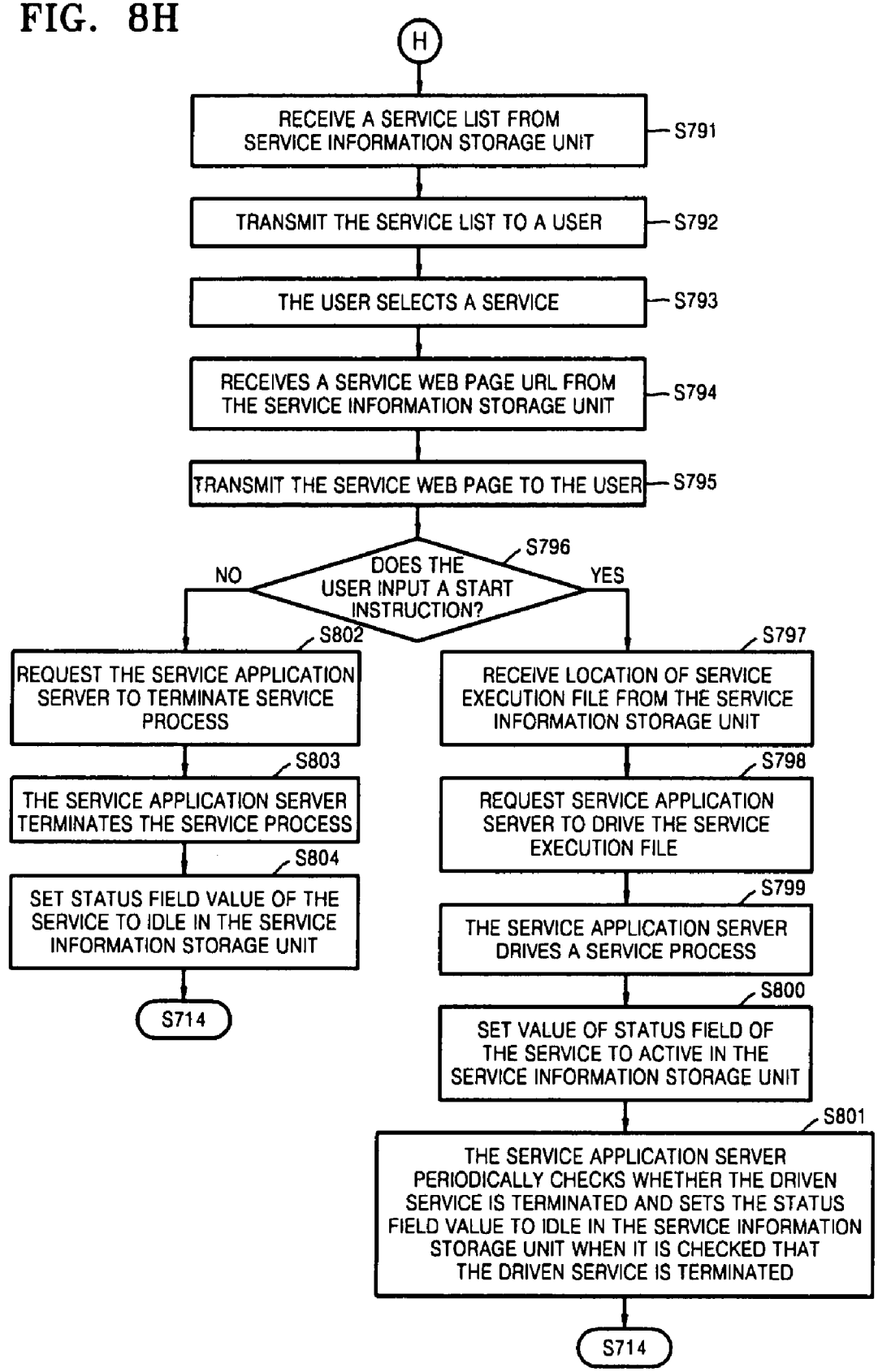
Figure 8I:
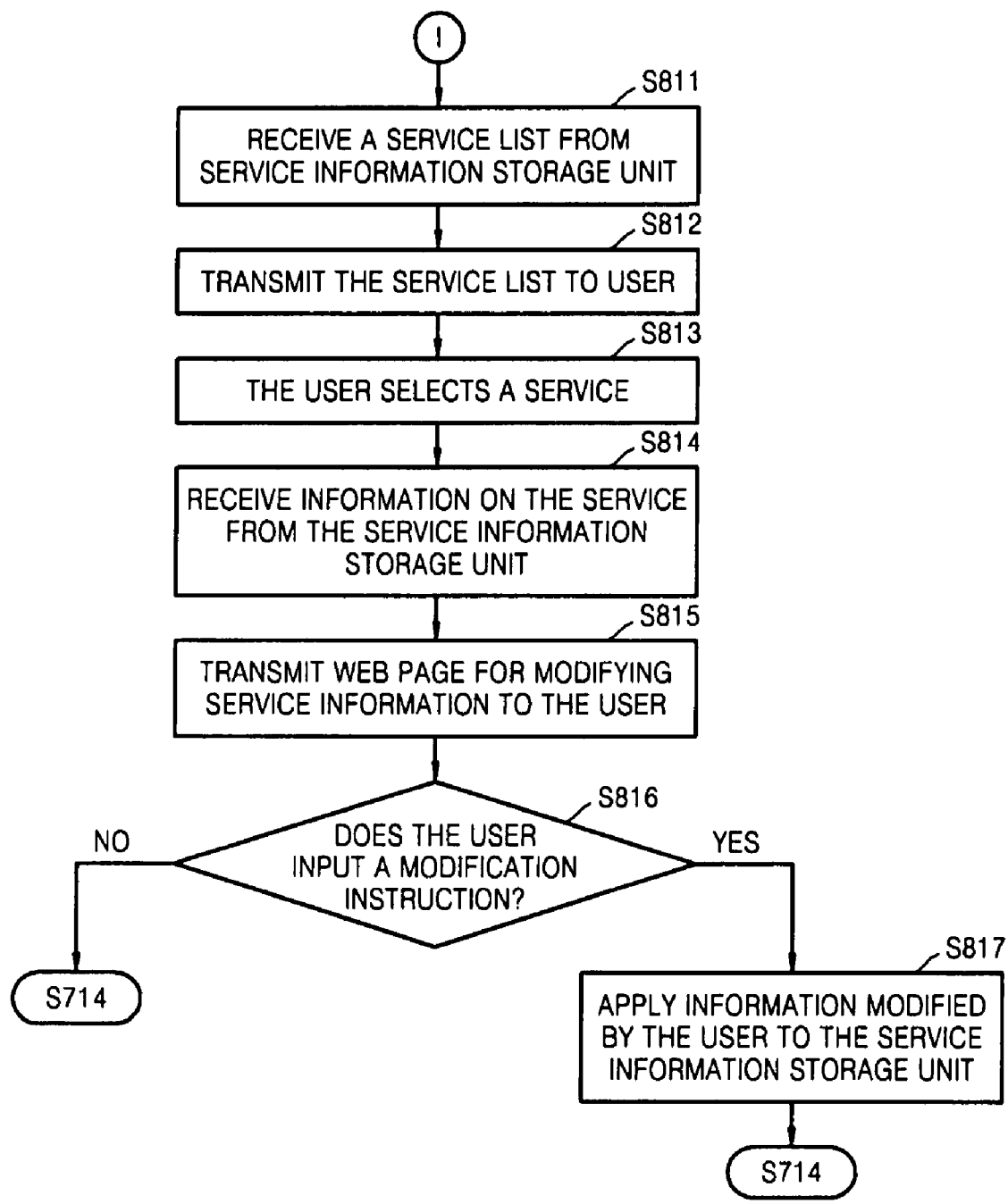
Figure 8J:
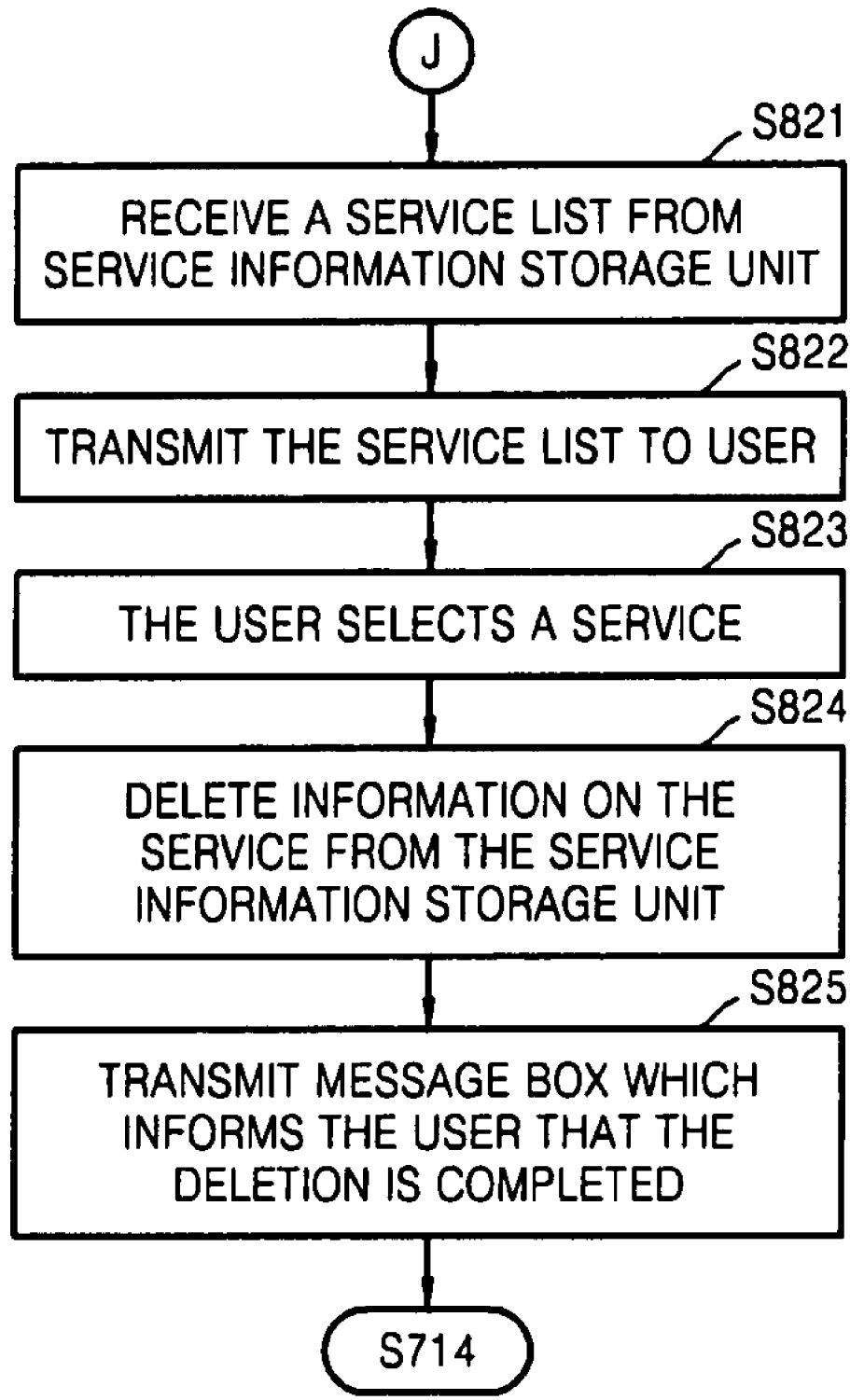
Figure 8K:
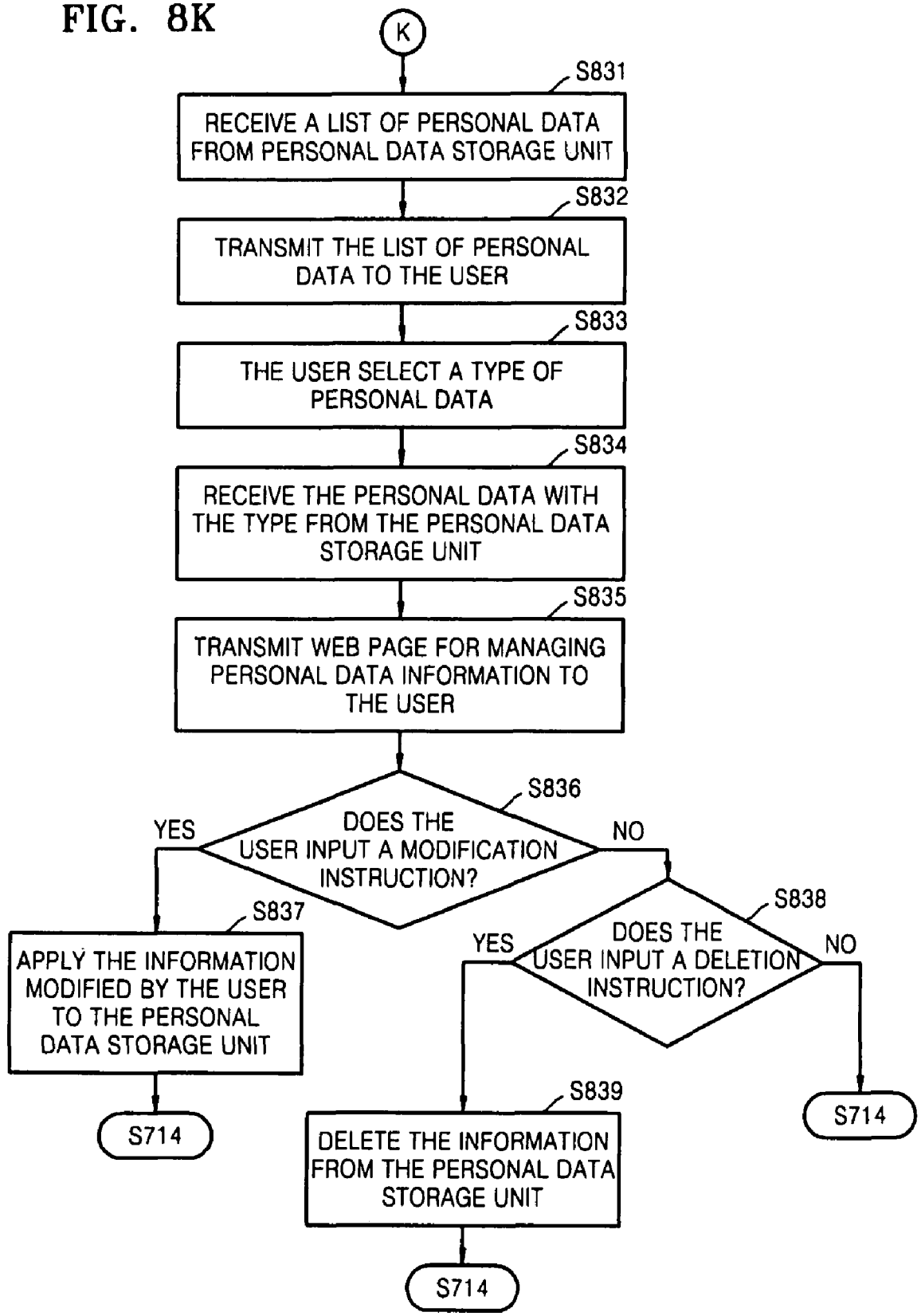
Figure 8L:
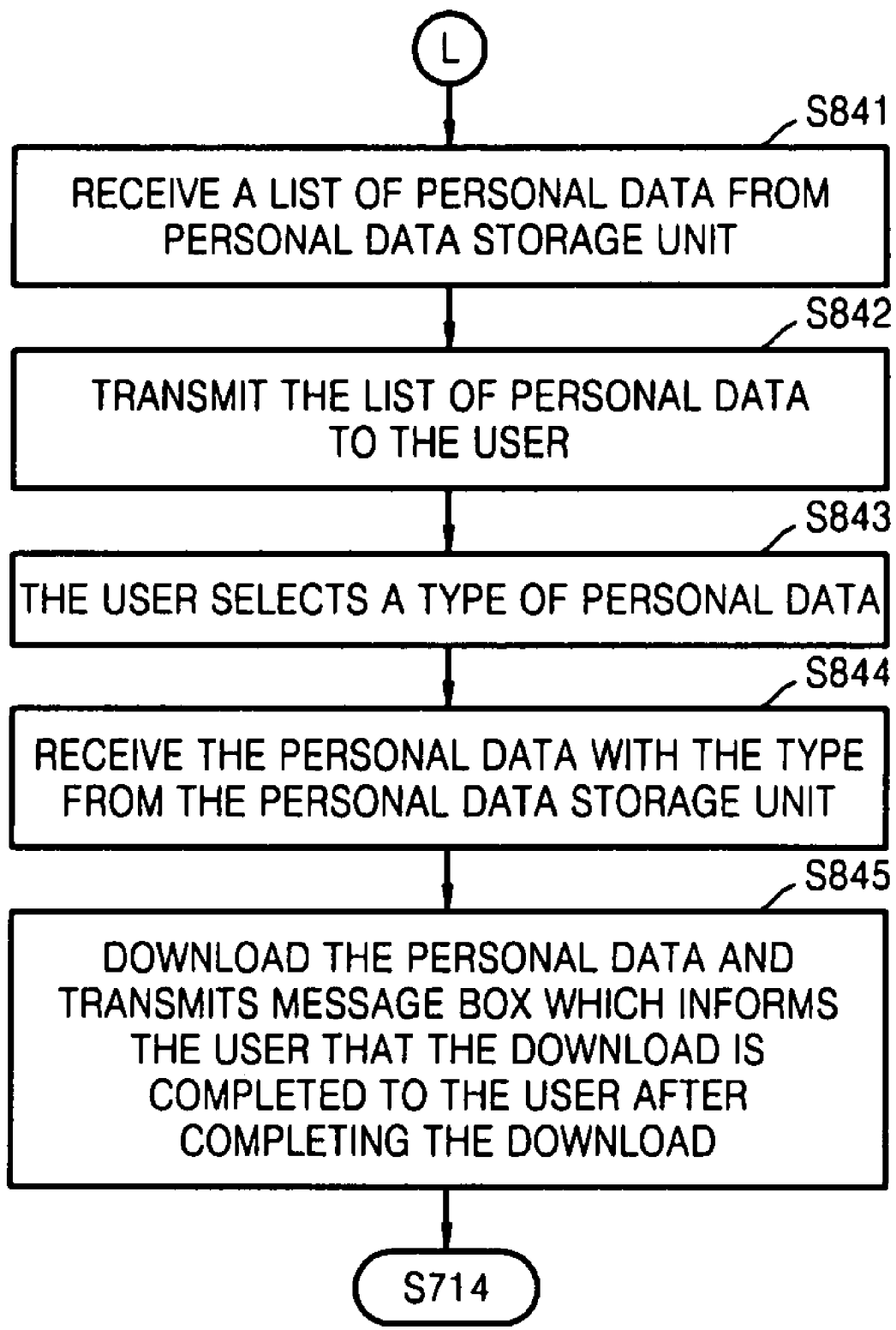
Figure 8M:
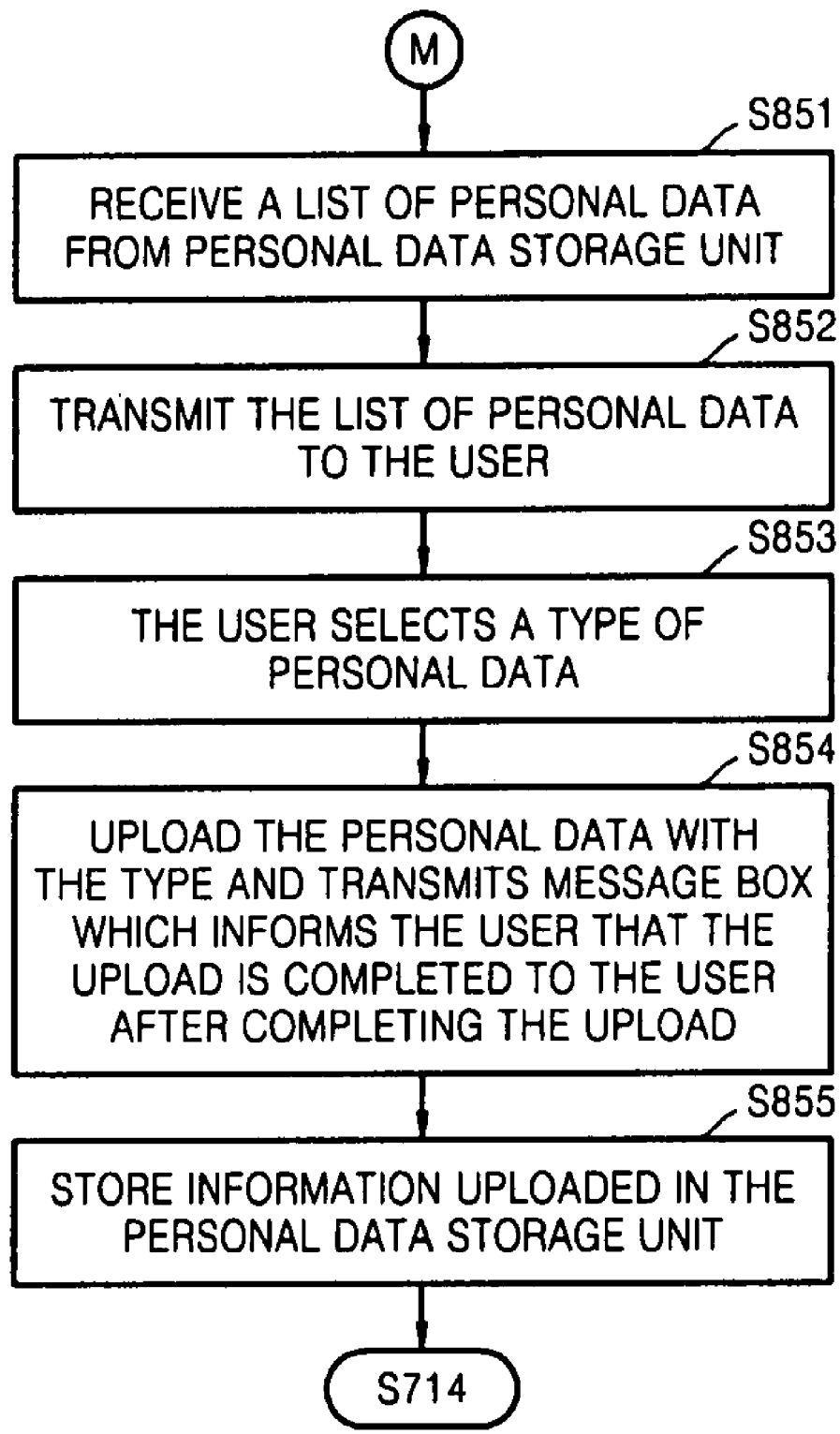

The service template construction information 300 includes graphical information for graphical shape as shown FIG. 4. It is on types of the components which constitute the service template and component connection information. The service template construction information 300 is transmitted to the web browser of the user and displayed so that the user can perform a customizing process. The service application 310 is constructed with a service web page 311 and a service logic program 312 as service code for the service template. The service web page 311 receives a user's input needed for executing a service logic program 312 from the user, before executing the service logic program 312. The service web page 311 provides a GUI so that the user can start the service or stop the executed service. The service logic program 312 includes logic of the service.

FIG. 4 illustrates a shape of a service template displayed to user in order to provide a service customizing process according to an embodiment of the present invention.

Referring to FIG. 4, parts 400 and 410 which a user can customize among combinations of components are alerted to the user. The user can customize the parts by modifying properties of the components 400 or selecting 410 one component among a plurality of candidate components. When the properties of the components are modified, there is provided a function of searching for member information (a phone number, a weblog/homepage URL, taste in contents) or personal data (a phone book, a group phone book, and a multimedia file) stored in a portal.

FIG. 5 illustrates a format of a result value of a service customizing process according to an embodiment of the present invention.

Referring to FIG. 5, the format of the result value is represented as a list of "(component name, {property 1, value}, . . . , {property n, value})". The property of the component that is not customized by the user is set as "Default".

FIG. 6 illustrates a format of service information stored in a service information storage unit 275 as a result of registration of service according to an embodiment of the present invention.

Referring to FIG. 6, service information stored in the service information storage unit 275 includes a service name, a service web page URL, a location of a service execution file, a URL for dynamically providing personal data, a log permission, and a service status. The service information storage unit 275 includes information on the services generated by the user.

FIGS. 7 and 8A to 8M are flowcharts illustrating a method of providing web-based personalized service according to an embodiment of the present invention.

Referring to FIGS. 2, 7 and 8A to 8M, when the user accesses a service portal by using the web browser 110 of the personal device (operation S700), the service portal transmits a main homepage of the service portal to the user (operation S701) and waits for a user input (operation S702). When the user selects a item in the menu in the home page, the service portal analyzes the user input (operations S710 to S750, S770 to S790, and S810 to S850).

When the user inputs a membership subscription instruction (operation S710), the service portal transmits a web page into which member information can be input to the user (operation S711). When the user inputs the member information (operation S712), the service portal stores the information input by the user in the personal data storage unit 276 (operation S713). After the information is stored, the service portal transmits "mypage", into which a instruction for the personalized service, to the user (operation S714) and waits for a user input (operation S702).

When the user inputs a login instruction (operation S720), the service portal transmits a web page into which login information can be input to the user (operation S721). When the user inputs the login information (operation S722), the service portal receives a user ID and a password from the member information of the personal data storage unit 276 (operation S723) and compares the received user ID and the password with the user input (operation S724). When the user ID and the password are matched with the user input (operation S725), the service portal transmits mypage to the user (operation S714) and waits for a user input (S702). When the user ID and the password are not matched with the user input (operation S725), a message box which informs the user the login failure is transmitted to the user (operation S727). The service portal transmits the home page of the service portal to the user (operation S701) and waits for a user input (operation S702).

When the user inputs a logout instruction (operation S730), the service portal transmits the home page of the service portal to the user (operation S701) and waits for a user input (operation S702)

When the user inputs a service survey instruction (operation S740), the service portal transmits a web page in which a service can be searched for to the user (operation S741), and the user inputs a keyword of the service desired to be found (operation S742). The service portal transmits a list of services of which names include the keyword input by the user to the user (operation S743). The user selects a service from the service list (operation S744). The service portal receives an experience animation corresponding to the service selected by the user from the experience animation storage unit 271 (operation S745) and transmits the experienced animation to the user (operation S746). The service portal transmits mypage to the user (operation S714) and waits for a user input (operation S702).

When the user inputs a service customizing instruction (operation S750), the service portal receives a service template list from the service template storage unit 272 (operation S751). After a web page for the received service template list is transmitted to the user (operation S752), when the user selects a service from the list (operation S753), the service portal receives the service template construction information 300 and the service application 310 for the service selected by the user from the service template storage unit 272 (operation S754) and transmits the service template construction information 300 to the user (operation S755). The user completes the customizing process for parts which can be customized in the service template construction information page (operations S756 and S757). When the customizing process is completed, the service portal receives an animation corresponding to the service from the simulation animation storage unit 273 (operation S758), applies the customizing information to the animation (operation S759), and transmits the animation to the user (operation S760). When the user completes a viewing process of the animation after controlling the animation (operations S761 and S762), the service portal transmits a web page for registering a service to the user (operation S763). The user completes an input process of the user in a service registration form (operation S764), the service portal applies the input value of the user for the service registration and the service customizing information to the service logic program 312 (operation S765). The service program 312 is built (operation S766). The input value of the user for the service registration and the information on the service execution file is stored in the service information storage unit 275 (operation S767). When the service registration is completed, a message box which informs the user that the registration is completed is transmitted to the user (operation S768). The service portal transmits mypage to the user (operation S714) and waits for a user input (operation S702).

When the user inputs a service generation instruction (operation S770), the service portal receives a software list for each operation system from the service generation tool storage unit 274 and transmits a web page about the list (operation S771). When the user selects a software download from the list (operation S772), the service portal receives the software selected by the user from the service generation tool storage unit 274 and downloads the software to the user. When the download is completed, a message box which informs the user that the download is completed is transmitted to the user (operation S773). The user executes the downloaded software and installs the software in the personal device (operation S774). The user completes the installation of the software and performs visual editing of the service by using a graphic editor which is the service generation tool (operation S775). After the editing of the service is completed, the service is stored (operation S776). Both service code and makefile are automatically created by inputting a visual form of the service by using a code generation tool (operation S777). The automatically generated service code is built by using the created makefile (operation S778). The built service is tested by using a service testing tool (operation S779). When errors occur in the testing, the current process returns to operation S775. When there is no error in the testing, the user terminates the service generation. The service portal transmits the mypage to the user (operation S714) and waits for a user input (operation S702).

When the user inputs a service upload instruction (operation S780), the service portal transmits a web page in which a service can be uploaded to the user (operation S781). The user selects a service execution file to be uploaded and uploads the service execution file (operation S782). When the upload is completed, the service portal transmits a message box which informs the user that the upload is completed to the user (operation S783). The service portal transmits a web page for registering a service to the user (operation S784). The user completes the user input for registering the service (operation S785). The input value of the user for the service registration and the information on the service execution file is stored in the service information storage unit 275 (operation S786). When the service registration is completed, a message box which informs the user that the registration is completed is transmitted to the user (operation S787). The service portal transmits mypage to the user (operation S714) and waits for a user input (operation S702).

When the user inputs a service execution instruction (operation S790), the service portal receives a service list from the service information storage unit 275 (operation S791) and transmits the service list to the user (operation S792). The user selects a service from the service list (operation S793). The service portal receives a service web page url for the service selected by the user from the service information storage unit 275 (operation S794) and transmits the service web page to the user (operation S795). When the user selects a start button (operation S796) after inputting an instruction needed for executing the service in the service web page, the service portal receives a location of the service execution file from the service information storage unit 275 (operation S797) and requests the service application server 260 to drive the service execution file (operation S798). The service application server 260 drives the service execution file (operation S799) and sets a value of the status field of the service to active in the service information storage unit 275 (operation S800). The service application server 260 serves to periodically check whether the service process is terminated, through a service live test. When the service is terminated, the value of the status field of the service is set to idle in the service information storage unit 275 (operation S801). The service portal transmits mypage to the user (operation S714) and waits for a user input (operation S702). When the user input is not a start instruction (operation 796), the service application server 260 is requested to terminate the service process (operation S802). The service application server 260 terminates the service process (operation S803) and sets the value of the status field of the service to idle in the service information storage unit 275 (operation S804). The service portal transmits mypage to the user (operation S714) and waits for a user input (operation S702).

When the user inputs a service information management instruction (operation S810), the service portal receives a service list from the service information storage unit 275 (operation S811) and transmits the service list to the user (operation S812). The user selects a service from the service list (operation S813). The service portal receives service information on the service selected by the user from the service information storage unit 275 (operation S814) and transmits a web page for modifying the service information (operation S815). When the user inputs an information modification instruction (operation S816), the input value of the user is applied to the service information storage unit (operation S817), and the service portal transmits mypage to the user (operation S714) and waits for a user input (operation S702). When the user input is not the information modification instruction (operation S816), the service portal transmits mypage to the user (operation S714) and waits for a user input (S702).

When the user inputs a service delete instruction (operation S820), the service portal receives a service list from the service information storage unit 275 (operation S821) and transmits the service list to the user (operation S822). The user selects a service from the service list (operation S823). The service portal deletes service information on the service selected by the user from the service information storage unit 275 (operation S824) and transmits a message box which informs the user that the deletion of the service information is completed to the user (operation S825). The service portal transmits mypage to the user (operation S714) and waits for a user input (operation S702).

When the user inputs a personal data management instruction (operation S830), the service portal receives a list of personal data from the personal data storage unit 276 (operation S831) and transmits the list of the personal data to the user (operation S832). The user selects a type of data from the list of the personal data (operation S833). The service portal receives personal data on the type of the personal data selected by the user from the personal data storage unit 276 (operation S834) and transmits a web page for managing the personal data information to the user (operation S835). When the user inputs an information modification instruction (operation S836), the user input is applied to the personal data storage unit 276 (operation S837). The service portal transmits mypage to the user (operation S714) and waits for a user input (operation S702). When the user input is not the information modification instruction (S836) but the delete instruction (operation S838), the service portal deletes the data from the personal data storage unit 276 (operation S839), transmits mypage to the user (operation S714), and waits for a user input (operation S702). When the user input is not the information modification instruction (operation S836) and the deletion instruction (operation S838), the service portal transmits mypage to the user (operation S714) and waits for a user input (operation S702).

When the user inputs a personal data download instruction (operation S840), the service portal receives the list of the personal data from the personal data storage unit 276 (operation S841) and transmits the list of the personal data to the user (operation S842). The user selects a type of data from the list of the personal data (operation S843). The service portal receives personal data on the type of the personal data selected by the user from the personal data storage unit 276 (operation S844) and downloads the personal data with the selected type. A message box which informs the user that the download is completed is transmitted to the user after completing the download of the personal data (operation S845). The service portal transmits mypage to the user (operation S714) and waits for a user input (operation S702).

When the user inputs a personal data upload instruction (operation 850), the service portal receives the list of the personal data from the personal data storage unit 276 (operation S851) and transmits the list of the personal data to the user (operation S852). The user selects a type of data from the list of the personal data (operation S853) and uploads the personal data with the type selected by the user. A message box which informs the user that the upload is completed is transmitted to the user after completing the upload of the personal data (operation S854). The service portal stores the uploaded contents in the personal data storage unit 276 (operation 855), transmits mypage to the user (operation S714) and waits for a user input (operation S702).

In the present invention, the user can receive a personalized service at any time, in any place, by accessing the service portal through the personal device. In addition, since interaction with the service portal is performed by using a web page through a web browser, a general user having no programming technique can easily generate and use the user's own service.

In addition, the personal data distributed over the device can be centralized on the service portal, and the data centralized on the portal can be used during runtime of the personalized service generated according to an embodiment of the present invention. In addition, the personal data stored in the personal device can be used during runtime of the service by accessing the personal device and receiving the personal data from the personal device. Accordingly, the personalized service generated according to an embodiment of the present invention can use both of the centralized personal data and the distributed personal data.

In addition, unlike the existing method of providing the personalized service, in the present invention, more various personalized service can be provided. The same personal information can be variously processed. Conceptually, since a user who desires to use a service directly prepares the desired service, real personalization is embodied.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

What is claimed is:

1. An apparatus for providing a web based personalized service, the apparatus comprising:
   a service information storage unit in which information on a service including a service name and a URL for dynamically providing personal data is stored;
   a service generation unit which provides software used to generate a service so that a user generates the service by using the software suitable for an operating system of a personal device of the user;
   a service registration unit which stores the generated service, receives the information on the generated service from the user, and stores the information in the service information storage unit; and
   a service execution unit which provides the information on services generated by the user to the user and executes a service which is requested by the user to be executed on the basis of the information on the generated services;
   a service customizing unit which provides a service template to the user,
   wherein the service template includes a service logic program which customizes a service by using service template construction information including graphic information on components that constitutes the service template and service customizing information that are property values of the components modified by the user,
   wherein the service customizing unit searches for personal data of the user, when the user modifies the property values of the components.

2. The apparatus of claim 1, wherein the service generation unit provides software which is a graphic editor including a palette for providing building blocks that are components which constitute the service.

3. The apparatus of claim 1, wherein the service generation unit further provides software for testing the service.

4. The apparatus of claim 1, further comprising:
   a service template storage unit in which the service template that is a template for the service to be generated is stored.

5. The apparatus of claim 4, wherein the service template further comprises a service web page which provides a GUI (graphical user interface) for receiving an input needed for executing the service logic program and an input for executing the customized service or stopping the executed customized service from the user to the user.

6. The apparatus of claim 4, wherein the service registration unit builds the service logic program on the basis of the service customizing information.

7. The apparatus of claim 4, wherein the service registration unit receives information on a service to be customized including the service name and the URL for dynamically providing personal data from the user and builds the service logic program on the basis of the received information.

8. The apparatus of claim 4, wherein when the service is customized, the service registration unit stores the customized service, and the service information storage unit stores information on the customized service.

9. The apparatus of claim 4, further comprising:
   a simulation animation storage unit in which an animation that can simulate the customized service; and
   a service simulation unit which applies the service customizing information to the animation and transmits the animation to a web browser of the user.

10. The apparatus of claim 1, further comprising a service information management unit which provides the information on a service stored in the service information storage unit to the user and stores information on a modified service in the service information storage unit when the user modifies the information on the service.

11. The apparatus of claim 1, further comprising a service deletion unit which deletes information on a service requested to be deleted from the service information storage unit, when the user requests the service to be deleted.

12. The apparatus of claim 1, wherein the service execution unit stops executing a service requested to be stopped, when the user requests the executed service to be stopped.

13. The apparatus of claim 10, wherein when the user selects a service, the service execution unit transmits a web page corresponding to a URL of a service web page of the selected service stored in the service information storage unit to a web browser of the user.

14. The apparatus of claim 1, wherein when the user selects a service, the service execution unit executes the selected service by using a location of the selected service stored in the service information storage unit.

15. The apparatus of claim 1, further comprising a service application server which modifies status information on a executed service stored in the service information storage unit into an active status, and when execution of the executed service is requested to be stopped, modifies the status information on the requested service stored in the service information storage unit into an idle status.

16. The apparatus of claim 15, wherein when the executed service is terminated, by periodically checking whether the executed service is terminated, the service application server modifies the status information on the terminated service stored in the service information storage unit from an active status to an idle status.

17. The apparatus of claim 1, further comprising a service searching unit which searches for a service related to a key word by receiving the key word from the user.

18. The apparatus of claim 1, further comprising:
- an experience animation storage unit in which an experience animation that displays execution processes while executing the service is stored; and
- a service experience unit which provides the experience animation for a service selected by the user.

19. A method of providing a web based personalized service, the method comprising:
- (a) providing software used to generate a service so that a user generates the service by using the software suitable for an operating system of a personal device of the user;
- (b) storing the generated service, receiving information on the generated service including a service name and a URL for dynamically providing personal data, and storing the information;
- (c) providing the information on services generated by the user to the user and executing a service which is requested by the user to be executed on the basis of the information on the services; and
- (d) providing, to a computer of the user, a service template which is a template for a service to be generated, wherein the service template includes a service logic program which customizes the service by using service template construction information including graphic information on components that constitutes the service template and service customizing information that are property values of the components modified by the user wherein in (d), searching for personal data of the user, when the user modifies the property values of the components.

20. The method of claim 19, wherein in (a), there is provided software which is a graphic editor including a palette for providing building blocks that are components which constitute a service.

21. The method of claim 19, wherein in (a), software for testing the service is further provided.

22. The method of claim 19, wherein the service template further comprises a service web page which provides a GUI (graphical user interface) for receiving an input needed for executing the service logic program and an input for executing the customized service or stopping the executed customized service from the user to the user.

23. The method of claim 19, wherein in (b), the service logic program is built on the basis of the service customizing information.

24. The method of claim 19, wherein in (b), information on a service to be customized including the service name and the URL for dynamically providing personal data is received, and the service logic program is built on the basis of the received information.

25. The method of claim 19, wherein in (b), when the service is customized, the customized service is stored, and information on the customized service is received from the user and stored.

26. The method of claim 19, further comprising applying the service customizing information to an animation that can simulate the customized service and transmitting the animation to a web browser of the user.

27. The method of claim 19, further comprising providing the stored information on a service to the user and storing information on a modified service when the user modifies the information on the service.

28. The method of claim 27, wherein in (c), when the user selects a service, a web page corresponding to a URL of a service web page of the predetermined service included in information on the selected service is transmitted to a web browser of the user.

29. The method of claim 19, further comprising deleting information on a service requested to be deleted, when the user requests a service requested to be deleted.

30. The method of claim 19, wherein in (c), when the user requests the executed service to be stopped, execution of the service requested to be stopped is stopped.

31. The method of claim 19, wherein in (c), when the user selects a predetermined service, the selected service is executed by using a location of the selected service included in the information on the predetermined service.

32. The method of claim 19, further comprising (e) modifying status information on a executed service into an active status, and when execution of the service is requested to be stopped, modifying the status information on the requested service into an idle status.

33. The method of claim 32, wherein in (e), when the executed service is terminated by periodically checking whether the executed service is terminated, modifying the status information on the terminated service from an active status to an idle status.

34. The method of claim 19, further comprising searching for a service related to a key word by receiving the key word from the user.

35. The method of claim 19, further comprising providing the experience animation that displays execution processes while executing the service for a service selected by the user.

\* \* \* \* \*